A. E. SPINASSE.
GLASS WORKING APPARATUS.
APPLICATION FILED OCT. 21, 1908.
921,747. Patented May 18, 1909.
3 SHEETS—SHEET 1.
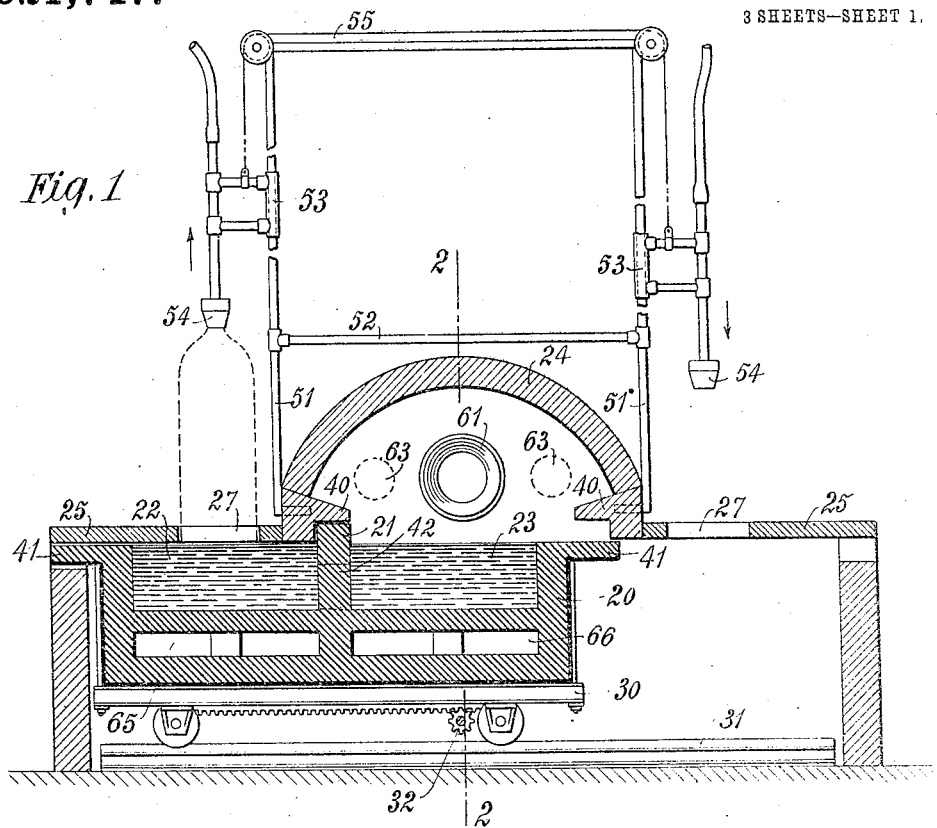
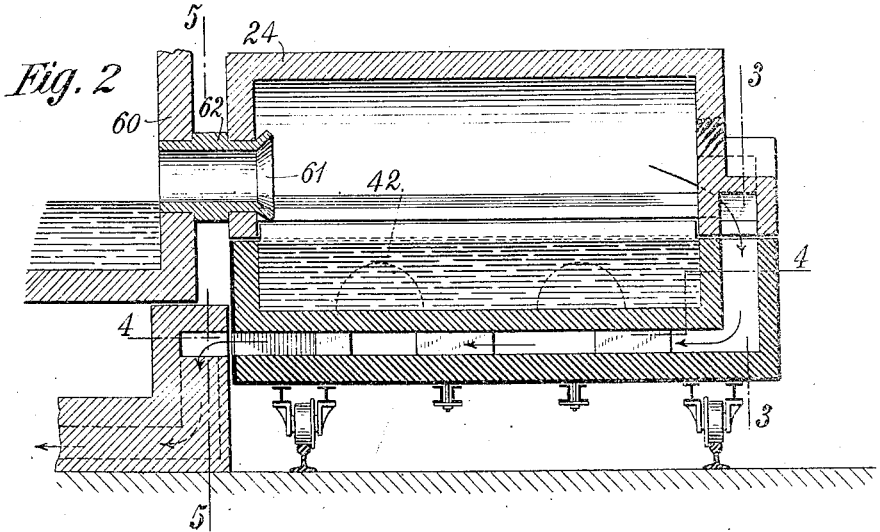

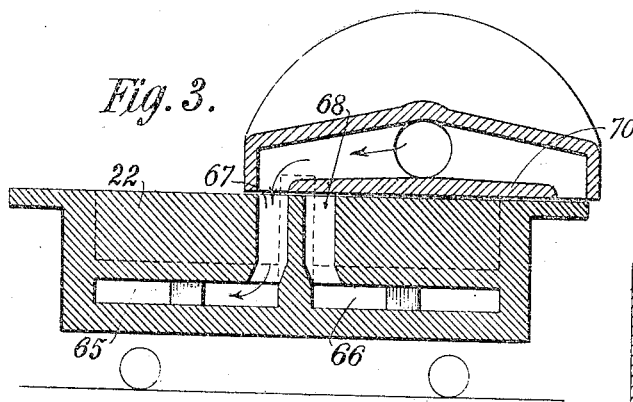
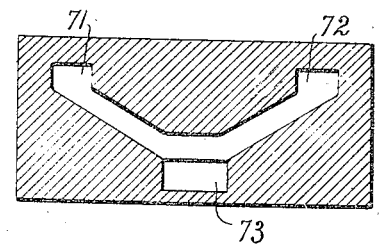
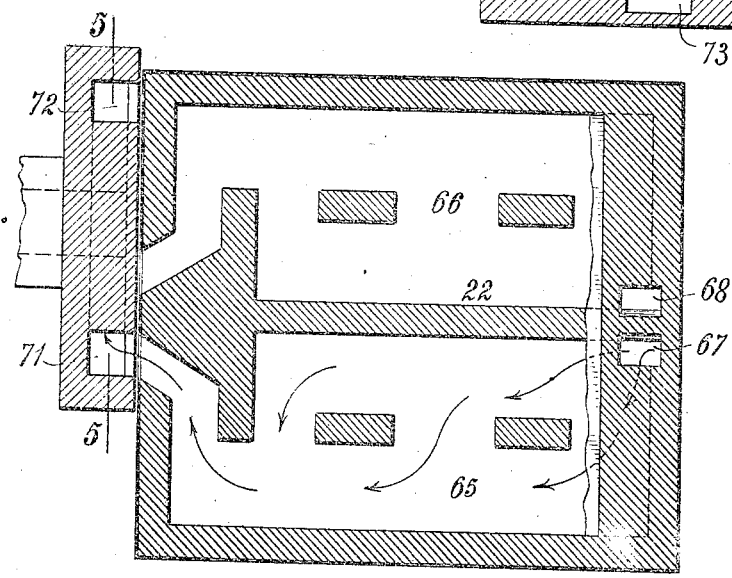
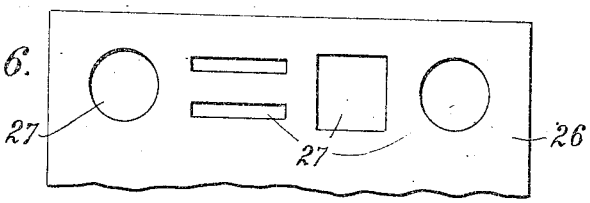
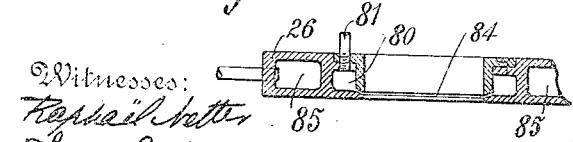

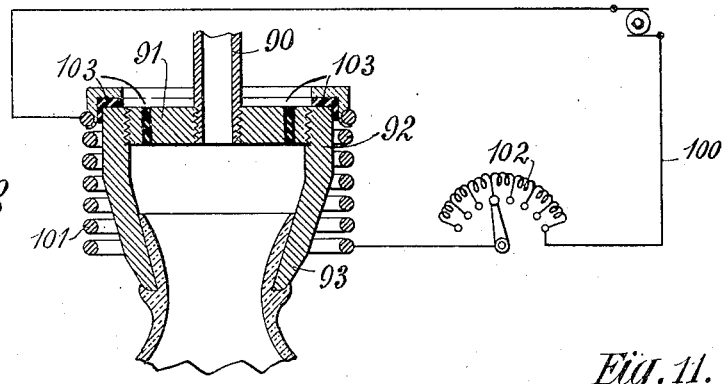
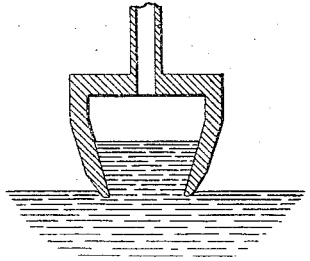
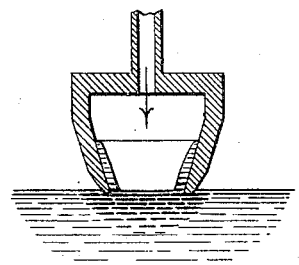
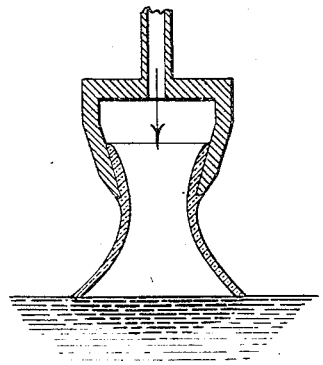
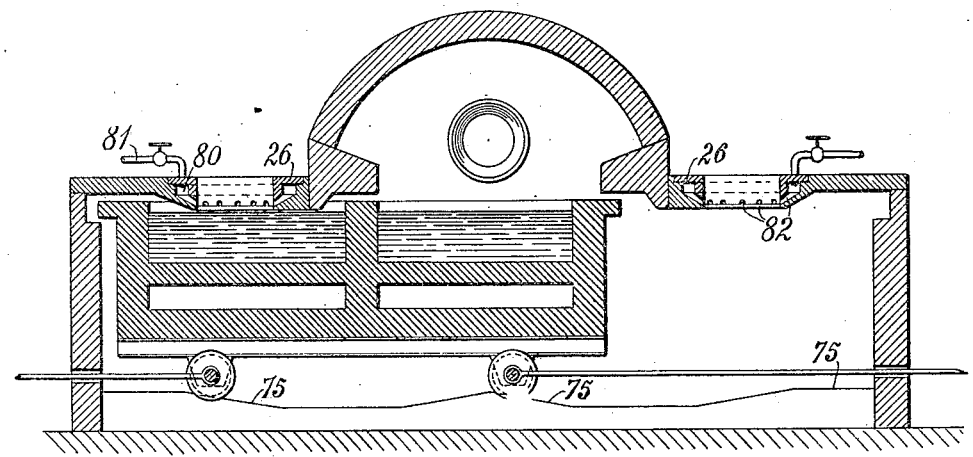

UNITED STATES PATENT OFFICE.

ARTHUR E. SPINASSE, OF MOUNT VERNON, OHIO, ASSIGNOR OF ONE-FOURTH TO HERBERT C. WOOD, OF MOUNT VERNON, OHIO.

GLASS-WORKING APPARATUS.

No. 921,747.

Specification of Letters Patent.

Patented May 18, 1909.

Application filed October 21, 1908. Serial No. 458,858.

*To all whom it may concern:*

Be it known that I, ARTHUR E. SPINASSE, a citizen of the United States, residing at Mount Vernon, in the county of Knox and State of Ohio, have invented certain new and useful Improvements in Glass-Working Apparatus, of which I declare the following to be a full, clear, and exact description.

This invention relates to improvements in glass furnaces and apparatus for drawing glass, more particularly with reference to devices for the manufacture of window glass.

Among the objects of the invention are to provide improvements in the delivering of the glass for drawing purposes, also to provide a novel construction of tank and hood or cap for properly heating the molten glass and bringing the same into position for drawing; also to provide an improved form of heating arrangement for the tank; also to provide an improved form of bait to be used in connection with the glass drawing process.

In more specific terms, the invention comprises a movable tank for containing molten glass, which tank is divided into compartments and coöperates with an inclosing hood or cap whereby either compartment may be brought under the hood for melting purposes while the other compartment is left exposed at one side or the other for drawing by the use of the bait. The heat flues are arranged so that the heat is automatically shifted into contact with the bottom of the exposed tank by the movement of the tank itself into such exposing position.

With the above mentioned objects in view, together with certain other incidental objects hereinafter set forth, these improvements will now be described more in detail with particular reference to the preferred form of the embodiment thereof shown in the attached drawings forming part of this specification.

Of said drawings Figure 1 represents a sectionalized view of the movable tank and its overlying hood, with the bait apparatus used for drawing from one or the other of the tank compartments. Fig. 2 is a cross-section on the line 2—2 of Fig. 1. Fig. 3 represents a sectionalized view on the line 3—3 of Fig. 2, showing the heat flue arrangement. Fig. 4 represents a horizontal sectional view on the line 4—4 of Fig. 2, also showing the heat flue arrangement and the arrangement of the partitions forming the heat chambers beneath the tank compartments. Fig. 5 represents a vertical sectional view on the line 5—5 of Figs. 2 or 4 showing the duplex outlet flue. Fig. 6 represents a detail plan of the slab which overlies the tank compartments and is formed with the various drawing apparatus. Fig. 7 represents a detailed sectional view of a portion of this slab showing certain channels formed therein for the distribution of gas for heating or cooling. Fig. 8 represents a detailed sectional view of the improved form of bait. Figs. 9, 10 and 11 represent detailed sectional views illustrating the method of use of this bait, and Fig. 12 represents another sectional view of the tank and hood showing a special form of track for supporting the tank in its lateral movement.

The movable tank 20, shown in Fig. 1, is divided by a bridge-wall 21 into two compartments, 22 and 23. Superposed over this tank is a cylindrical or arch-shaped hood 24. Adjacent to this hood and on either side thereof is a casing 25 which overlies the movable tank. This casing may be provided with horizontal slabs 26, such as are shown in detail in Fig. 6, in which slabs are formed apertures 27 of various shapes, through which baits may be inserted for the drawing of glass from the molten supply in the movable tank. These slabs are shown in Fig. 12 as separate from the rest of the casing, there being certain other improvements which will later be described in connection with these drawing apertures. But for simplicity's sake the apertures 27 are shown in Fig. 1 as formed directly in the overlying casing. There is one of these drawing apertures 27, or a set thereof as desired, on each side of the hood 24, the purpose being to move the tank laterally so as to bring each compartment under its respective drawing aperture. For this purpose the tank 20 is mounted upon an independent truck 30 which rolls upon a suitable track 31 and is moved by means of any suitable gear 32 meshing with a rack on the underside of the truck, power being connected with this gear and rack by any desired means so as to move the tank laterally from one position to the other.

Of course the form of tank and hood, as well as the form of inclosing casing, and the moving means for the tank may be varied in a number of ways without departing from the spirit of this invention.

The interior wall of the hood 24 is formed with projecting shelves 40 (Fig. 1) under which the bridge-wall 21 rides when the tank is moved from one side to the other. By means of this construction, the heat flow from the hood is prevented from having access to the surface of the exposed compartment and its overlying slab. Furthermore, the end walls of the tank are provided with projecting flanged ends 41 which contact with the lower wall of the hood 24 below the shelf 40, so as to shut off the heat flow from the hood to the idle drawing aperture. This construction serves to isolate the one compartment which is below the hood from the outer atmosphere, and the other or drawing compartment, from the heat of the furnace within the hood 6, thus evenly equalizing the plasticity of the mass. Likewise, it will be observed that the length of the tank with reference to the size of the hood is such that when the tank is in its central position underneath the hood, the flanged ends 41 of the tank will simultaneously underlie and close the respective drawing apertures 27 above said flanged ends.

The bridge-wall 21 of the tank is formed with openings 42, shown in dotted lines in Figs. 1 and 2, so as to permit flow of the molten glass freely from one compartment to the other of the tank.

The hood 24 and tank 20 may be suitably reinforced at proper places, as well known in the art. The upright rods 51 and cross rods 52 above the hood serve the double purpose of reinforcing the hood and also as a guide for the slides 53 upon which are mounted the frames carrying the baits 54. These frames and baits are connected by a cable 55, the construction being such that when one of the baits 54 descends for contact with the glass for the drawing operation, the other bait ascends with the glass cylinder attached thereto in progress of being formed.

The molten glass is led into the tank 20 by the following means. A supply tank 60 (Fig. 2) contains the usual supply of molten glass, and is adjacent to the hood 24, being connected therewith by a delivery spout 61, which is loosely mounted in the walls of the supply tank and the hood and is accessible between said walls as at 62, shown in Fig. 2, to permit rotation of the delivery spout to bring new and unworn portions of the spout into delivery position. This delivery spout serves to conduct the molten glass from the supply tank 60 into the compartments of the movable tank 20, as will be readily understood.

The heat flues for heating the glass will now be described. The flow of heat is conducted through the said delivery spout 61 to the interior of the hood 24, so as to come in contact with the glass contained in the movable tank 20.

If desired, auxiliary flues 63 may be supplied leading into the hood, as shown in dotted lines in Fig. 1. This heat flow is arranged to be automatically shifted according to the movements of the tank 20 in the following manner, shown in Figs. 3, 4 and 5. Formed in said tank 20 and beneath the bottom wall of each compartment are heat compartments 65 and 66. There is a duplex inlet flue arrangement comprising the inlet flue 67 leading into heat chamber 65 and inlet flue 68 leading into chamber 66. At one end of the interior of the hood there is a stationary wall or abutment which so overlies this end of the tank that, as shown in Fig. 3, when the tank is shifted to its left-hand position, the heat may flow from the hood through the channel 67 into the heat chamber 65 underneath the compartment 22 exposed for the drawing operation. Likewise when the tank is shifted to its extreme right-hand position the heat flow will similarly enter the inlet flue 68 into the chamber 66 beneath its corresponding compartment 23, which will then be exposed for drawing in such position of the tank.

There is a duplex outlet flue shown in Figs. 4 and 5 comprising the channels or passages 71 and 72 for conducting away the heat from the respective heat chambers 65 and 66. When the tank is in the left-hand position the heat flow is through the inlet flue 67, chamber 65, and outlet flue 71 into the main outlet flue 73; whereas when the tank is in its other extreme position, the heat flow will be through the inlet flue 68, chamber 66, and outlet flue 72, as will readily be understood from the construction shown in the figures referred to. The dividing wall between the heat chambers 65 and 66 is suitably formed, as shown in Fig. 4, with the double channels leading into said outlet flues 71 and 72, so as to register in turn with said outlet flues in a manner that will readily be understood from the previous description.

From this construction it will be observed that the heat flow is automatically controlled solely by the movements of the tank itself for the purpose of shifting the heat flow underneath the compartment exposed for the drawing operation. This automatically cuts off the heat from the underside of the compartment which is subjected to the heat of the furnace. The heat flows from the inside of the tank to the outside through said flues and thus uses up the waste heat on its way to the main outlet flue. This shifting assists in preventing overheating of the glass in the compartment which underlies the hood, and turns the heat underneath the compartment at the drawing station, so that the glass will gradually get hotter at that point to compensate for the cooling down from the upper side of this compartment.

In the operation of this glass furnace, the movable tank 20 having been properly filled with molten glass and the heat flow turned on, the tank is shifted first to one side, as shown in Fig. 1, so as to bring the compartment 22 into drawing position, whereupon the bait 54 is lowered to contact with the glass through the drawing aperture 27. After this drawing operation the glass cylinder is severed, as will later be refered to; then the tank is shifted to the right so as to bring the recently heated compartment 23 underneath the other or right-hand drawing aperture 27, and the marred surface of the compartment 22 is now brought underneath the hood 24 to be remelted. The raising of the left-hand bait 54 in the drawing operation has in the meantime lowered the right-hand bait into position to be used for the drawing operation on that side.

The independent mounting of the tank upon the truck 30 permits a new tank to be readily substituted on the truck, if desired, so as to interfere as little as possible with the working of the furnace. This alternate shifting of the tank always produces a clean surface for each succeeding drawing operation, and the molten glass is not forced from one side to the other, but constantly remains undisturbed, unless otherwise desired. This aids in producing a better grade of glass, and prevents loss of residue from one operation to another. Furthermore, this construction permits the drawing slabs 26 to be close to the surface of the molten glass, which is quite an important feature in the drawing operation. These drawing slabs are only alternately subjected to the heat of the mass and consequently are somewhat cooled between succeeding operations.

The heat flow, as before described, is properly confined within the hood and conducted into the alternate heat chambers in the manner already set forth, so that this alternate shifting of the heat from one compartment of the tank to the other, is effected without the use of any damper whatsoever and solely by the movement of the tank itself.

The above advantages may be derived by other forms of devices, such as will produce relative movement between the hood and tank to cause the drawing apertures to overlie different portions of the tank in turn and to cause this automatic shifting of the heat flow, and the specific construction of the tank and its hood and overlying casing may be changed in various respects without departing from the spirit of the present invention.

In order to bring the body or surface of the molten or plastic glass close to the hood and the drawing apertures, and prevent access of too much air on the surface of the mass, the form of track shown in Fig. 12 is provided. The track is formed with raised portions 75 so that when the truck and its tank are moved to either of the extreme lateral positions for the drawing operation, the tank will be elevated to bring the surface of the molten glass close to the hood and to the drawing aperture. The lower walls of the hood and inclosing casing are suitably inclined, as shown in Fig. 12, at various places to permit of this elevating movement of the tank taking place with its lateral shifting movement. This construction more effectually shuts off the chilling currents of cold air from reaching the surface of the glass in the drawing compartment and thus benefits the quality of the glass drawn. This likewise permits the application of heating gas close to the surface of the glass for the puspose of severing at the end of the drawing operation, as will now be described.

As shown in Fig. 12, the slabs 26 and the inclosing casing are suitably formed with channels 80 for the circulation of gaseous fluids, such as hydro-oxygen gas, communicated through a tube 81. From these channels there are ports 82 leading into the drawing apertures in close proximity to the drawing surface of the glass. After the glass cylinder has been drawn to the desired extent, as shown in Fig. 1, this jet of hydro-oxygen flame is emitted from the ports 82 and renders the plastic glass more liquid right at the drawing point and makes it possible to thin down the wall of the glass cylinder at that point. Thus a slight increase in the blowing pressure will produce a slight swelling at this point where the jet of flame is applied, and thereby the usual thickness of the wall is reduced to a very small fraction. This wall may then be broken away from the mass to complete the drawing operation. To assist in this breaking operation, the heat of the said flame may be supplanted by a current of cold air for the purpose of chilling the thinned down portion of the glass cylinder which may then be more easily separated by breaking. The very thin portion of glass then remaining slightly projecting from the surface of the molten glass in the compartment and forming a slightly marred surface, is then soon remelted to a smooth surface when subjected to the heat of the furnace, as previously described.

Another form of slab 26 is shown in Fig. 7 where the channels 80 are connected with the drawing aperture by a continuous slit 84 in place of the various apertures 82. Likewise, this slab may be formed with channels or passages 85 for the free circulation of any heating or cooling agent, such as steam, air, water, &c., as the case may require. This will provide a slab of resistance which will not be liable to break under the effect of expansion produced by the different degrees of heat. The cooling or heating agent circulating within the hollow slab may also be varied by suitable valve arrangement, according to the variation of the heat in shifting the tank from one position to the other.

The particular form of bait used for the drawing operation will now be described. This bait is shown in Fig. 8 and comprises a pipe 90 threaded to a ring 91 which in turn is threaded to the walls 92 of the bait, which forms a tubular chamber, the diameter of which decreases toward its lower end, as shown in Fig. 8. Moreover, the walls 92 are constructed with a substantial decrease in thickness toward the lower end 93 where the periphery of the bait engages the molten glass.

The bait is first lowered so that its lower periphery is just brought in contact with the molten glass, whereupon suction or partial vacuum is produced in the inclosed chamber of the bait so that, as shown in Fig. 9, the molten glass rises into this chamber within the bait. The glass is held there for a short while, and then the vacuum is replaced by compressed air, while the bait gradually ascends from the molten mass, these succeeding positions being shown in Figs. 10 and 11. A valve and gage may be used by the operator to regulate the proper vacuum and compression for this purpose. When the column of molten glass is forced out of the bait chamber back to its previous place by introducing the air compression, a portion of the glass will remain and adhere to the hot wall of the bait, as shown in Figs. 10 and 11, thus forming a ring of plastic glass adhering to the inner walls of the chamber. The converging walls of the bait assist in retaining this glass in place during the lifting operation. The thickness of this ring may be varied and increased by holding the column longer within the chamber. Then the return of the glass to the rest of the mass, when the compression is turned on, will serve to blow the shoulders for the drawing of the cylinders and thus prevent the thinning down of the glass wall, as it is blown wider.

This process is described more in detail and is claimed in a separate application, Serial No. 458,961, filed on October 22, 1908 and is described here in order to illustrate the method of use of the particular bait herein described.

The thinning down of the walls of the bait, as shown at 93 Fig. 8, results in bringing the bait, where the same is made of iron or similar metal, as near as possible in accord with the coefficient of expansion of the glass. This assists in preventing the snapping of the glass and falling from the bait.

When the glass ring is contained within the bait, as shown in Figs. 8 and 10, the cooling and shrinking of the iron forming the bait will exert its pressure on the glass directly in contact with the inner surface of the bait, but this glass being arch-shaped will better withstand this outer pressure, and moreover being confined in this chamber formed by the tubular bait is protected so that it is subject to its own confined heat and cools off gradually without breakage.

If it is desired to use an auxiliary heating means for the bait, an electric circuit 100 (see Fig. 8) may be provided in which circuit is included a resistance coil 101, surrounding the bait and controlled by a switch 102 for the purpose of heating the coil 101 and thereby heating the inclosed bait. This electric coil may be used if desired where the drawing operation extends over a longer period when it might be desired to maintain the bait heated for a longer time.

With reference to the shape of the slab 26 containing the drawing apertures 27, as shown in Fig. 12, I will now explain a further feature and advantage which arises from the particular construction which I have devised, shown in Fig. 12. It will be noticed that the under surface of the slab 26 projects downwardly toward the tank as heretofore referred to, this being produced by increasing the thickness of the slab toward its central portion. The result of this is to bring the lower mouth of the drawing aperture 27 below the normal level of the slab itself so as thereby to bring this mouth of the aperture near the surface of the glass upon the diagonal and lateral movements of the tank.

Various constructions of the slab could be used for the purpose of thus securing the lowering or depressing of the mouth of the aperture toward the tank without departing from the spirit of this invention, it being desired to make it possible by a construction of this nature, to get the mouth of the drawing aperture close to the surface of the glass. Moreover by means of this construction, if there is relative movement between the slab and the tank, this mouth of the drawing aperture can be made to lie just above the surface of the molten glass, no matter what the level of the glass is within the tank compartment. This downward projecting mouth of the aperture can be made more or less pronounced as desired, to carry out the purposes mentioned.

It will be seen that with such downward projecting mouth the lateral and diagonal movement of the tank along its track, when it reaches the inclined portion 75 of the track, lifts the surface of the molten glass into the desired proximity with the mouth of the drawing aperture, which materially assists in keeping the molten glass from cooling, and has various other advantages which will be well understood in the art. The mouth of the drawing aperture may be brought within the tank as near the surface of the glass as may be necessary or desired, notwithstanding the surface of the glass may be variable, high or low, and this will make it possible to withdraw practically all of the molten glass from the tank.

While the drawings attached hereto show the preferred form of embodiment of these inventions, it will be understood that various other forms may be utilized all coming within the scope of the claims which follow.

What is claimed is as follows:

1. In a glass furnace, the combination with the tank for molten glass, of a hood with drawing apertures adjacent thereto, and means for causing relative movement between the tank and the hood whereby to cause the hood and drawing apertures to overlie different portions of the tank in turn.

2. In a glass furnace, the combination with the tank for molten glass, said tank being divided into connecting compartments, of a superposed casing including a hood and formed with drawing apertures to register with the different compartments; and means for causing relative movement between the tank and the said superposed casing and hood whereby to cause the hood to alternately overlie the different compartments while the drawing apertures alternately overlie the unhooded compartments.

3. In a glass furnace, the combination with a hood, of a horizontally movable tank divided into two compartments and constructed to permit movement laterally to bring either compartment under the hood and the other exposed for drawing.

4. In a glass furnace, the combination with a hood, of a horizontally movable tank divided into two compartments and constructed to permit movement laterally to bring either compartment under the hood and the other exposed for drawing; and a duplex bait apparatus coöperating therewith, one bait on each side of said hood and said baits having supporting connections for lowering one and raising the other.

5. In a glass furnace, the combination with a hood, of a tank divided by a bridge-wall into compartments and movable to expose either desired compartment outside the hood while the other remains inside; and said bridge wall and hood being constructed to engage and shut off the heat flow from the hood to the surface of the exposed compartment.

6. In a glass furnace, the combination with a hood, and a casing formed with drawing apertures on opposite sides of said hood, of a tank divided by a bridge-wall into compartments and movable to expose either compartment under its respective drawing aperture while the other compartment underlies the hood; and said hood and tank being constructed to cause engagement of the bridge-wall with the interior walls of the hood to shut off the heat flow from the hood to the drawing compartment, and also constructed to cause engagement of the outer wall of the tank with the hood to shut off the heat flow from the hood to the idle drawing-aperture.

7. In a glass furnace, the combination with a hood, and a casing formed with drawing apertures on opposite sides of said hood, of a movable tank situated below the hood and casing, the ends of said tank being formed with projecting flanges for simultaneously closing their respective drawing apertures when the tank is in its central position beneath the hood.

8. In a glass furnace, the combination with a hood, and a casing formed with drawing apertures on opposite sides of said hood, of a tank divided by a bridge-wall into compartments and movable to expose either compartment under its respective drawing aperture while the other compartment underlies the hood; and said hood and tank being constructed to cause engagement of the bridge-wall with the interior walls of the hood to shut off the heat flow from the hood to the drawing compartment, and said tank also constructed with projecting flanged ends to shut off the heat flow from the hood to the idle drawing-aperture and also to simultaneously close both the drawing apertures when the tank is in its central position beneath the hood.

9. In a glass furnace, the combination with a hood, of a tank divided into compartments and situated below said hood; an independent truck for supporting said tank; a track for supporting said truck; and means for moving said truck laterally along said track.

10. In a glass furnace, the combination with a hood, of a tank divided into compartments and constructed to permit movement laterally to bring either compartment under the hood and the other exposed for drawing; and a track for supporting the tank in its lateral movements, said track being formed with raised portions for elevating the tank at the extremity of its lateral movement when the drawing position is reached.

11. In a glass furnace, the combination with a hood, of a tank divided by a bridge-wall into compartments and movable to expose either desired compartment outside the hood while the other remains inside; said bridge-wall and hood being constructed to engage and shut off the heat flow from the hood to the surface of the exposed compartment; and a track for supporting said tank in its movements, said track being formed with raised portions for elevating the tank when either of its compartments is exposed for drawing.

12. In a glass furnace, the combination with the tank for molten glass, of a hood with drawing apertures adjacent thereto; means for causing relative movement between the tank and the hood whereby to cause the hood and drawing apertures to overlie different portions of the tank in turn; and flues connecting different portions of said tank and automatically controlled as to heat flow by means of said relative movement between the tank and the hood.

13. In a glass furnace, the combination with the tank for molten glass, said tank being divided into connecting compartments, of a superposed casing including a hood and formed with drawing apertures to register with the different compartments; means for causing relative movement between the tank and the said superposed casing and hood whereby to cause the hood to alternately overlie the different compartments while the drawing apertures alternately overlie the unhooded compartments; and flues connecting the hood with the exterior walls of said compartments and automatically controlled by said relative movement between tank and hood to shift the heat flow from contact with one compartment to the other.

14. In a glass furnace, the combination with a hood, of a horizontally movable tank divided into two compartments and constructed to permit movement laterally to bring either compartment under the hood and the other exposed for drawing; and two heat flues formed in said tank and connecting the hood with heat chambers under said compartments, with provisions existing by virtue of which the flues are controlled solely by the movement of the tank to shift the heat flow underneath the compartment exposed for drawing.

15. In a glass furnace, the combination with a hood, of a horizontally movable tank divided into two compartments and constructed to permit movement laterally to bring either compartment under the hood and the other exposed for drawing; heat chambers formed in said tank underneath each of said compartments; duplex inlet flues from said hood to said chambers; duplex outlet flues from said chambers; and surrounding casings constructed with walls and flues to direct the heat flow from the hood to alternative sets of inlet flue, heat chamber and outlet flue according to the respective drawing position of said tank.

16. In a glass furnace, the combination with a drawing tank for the molten glass, and a supply tank, of a delivery spout connecting said tanks and mounted revolubly to permit rotation to bring unworn portions of the spout into delivering position.

17. In a glass furnace, the combination with a drawing tank for the molten glass, and a supply tank, of a hood surmounting said drawing tank, and a heat and glass delivery spout mounted revolubly in the walls of said supply tank and said hood and accessible between said walls to permit rotation of the spout for the purpose described.

18. In a glass-drawing apparatus, a tubular bait forming a chamber the diameter of which tapers gradually and uniformly toward its lower end, substantially as and for the purposes described.

19. In a glass-drawing apparatus, a tubular bait forming a chamber the diameter of which tapers gradually and uniformly toward its lower end, and the walls of which chamber are constructed with a substantial decrease in thickness from the upper end toward said lower end.

20. In a glass drawing apparatus, the combination with a movable tank for containing the molten glass, of an overlying slab supported upon the stationary walls above the tank and having a downwardly projecting portion on its lower side formed with a drawing aperture therein; and means for moving said tank up and down to bring the level of the molten glass into proximity with the mouth of said drawing aperture.

21. In a glass furnace the combination with a laterally movable tank for containing the molten glass, of an overlying slab formed with a central drawing aperture projecting downwardly from the level of the slab into the interior of the tank, and a track for supporting said tank in its lateral movements, said track being formed with inclined portions to cause diagonal upward movement of the tank to bring the surface of the glass into proximity with the mouth of said drawing aperture.

22. In a glass furnace the combination with a laterally movable tank for containing the molten glass, of an overlying slab of increasing thickness toward its center portion and formed in said thickest portion with a drawing aperture projecting downward toward said tank; and a track for supporting said tank, said track having inclined portions for producing diagonal upward movement of the tank toward the slab to bring the mouth of the said aperture into proximity with the level of the glass in the tank.

In testimony whereof I affix my signature in the presence of two witnesses.

ARTHUR E. SPINASSE.

Witnesses:
HERBERT C. WOOD,
W. C. ROCKWELL.